Figure 1:
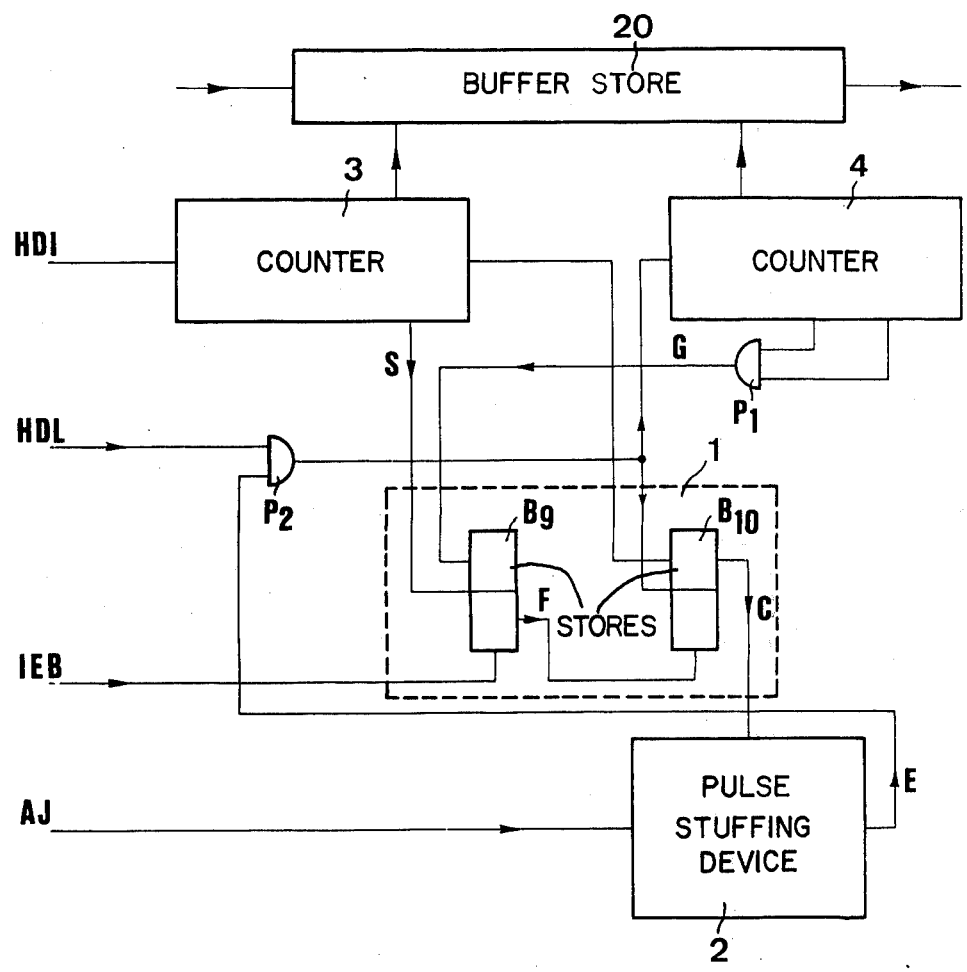

United States Patent [19]
Aveneau

[11] 4,072,826
[45] Feb. 7, 1978

[54] PULSE STUFFING DEMAND GENERATING DEVICE

[75] Inventor: André Auguste Aveneau, Clamart, France

[73] Assignee: Scholeman-Siemag Aktiengesellschaft, Germany

[21] Appl. No.: 671,822

[22] Filed: Mar. 30, 1976

[30] Foreign Application Priority Data

Apr. 18, 1975 France ............................ 75 12178

[51] Int. Cl.² .............................................. H04J 3/06
[52] U.S. Cl. .............................................. 179/15 AF
[58] Field of Search .............. 179/15 AF, 15 BS; 178/69.5 R

[56] References Cited
U.S. PATENT DOCUMENTS

| 3,420,956 | 1/1969 | Heightley | 179/15 AF |
| 3,830,981 | 8/1974 | Gruber | 179/15 AF |

Primary Examiner—David L. Stewart
Attorney, Agent, or Firm—Holman & Stern

[57] ABSTRACT

A pulse stuffing demand generating device of the kind comprising means for comparing the phases of the write clock signals HDI and the read clock signals HDL of a buffer store in which are written and read multiplexed digital information, the said store having a capacity of $n$ binary digits, wherein the said means comprise first means for comparing the phases of the rising edges of signals HDL and HDI, the said first means supplying a pulse stuffing demand signal when the rising edge of signal HDL is located in the "one" portion of the HDI signal, and second means for supplying a signal authorizing the operation of the said first means, the said signal being supplied when one among $n$ rising edges of the HDI signal is located in the "zero" portion of a signal resulting from the division by $n$ of the HDL signal and the duration of which is equal to one binary digit time slot.

2 Claims, 4 Drawing Figures

PULSE STUFFING DEMAND GENERATING DEVICE

The present invention relates to the pulse stuffing of digital signals and more particularly to a device for comparing the phases between the read and write signals of the buffer store of a positive pulse stuffing device.

The digital signals available at the input terminals of an equipment are generally subject to a jitter peculiar to each of the signals involved.

Pulse stuffing consists of changing the digit rate of each pulse stream by adding binary digits, so that it can accord with a single rate $D_e$.

French Pat. No. 1,505,037, for example, describes a multiplex equipment for plesiochronous channels. The information is stored in buffer stores at the frequency $F_e$ of the clock peculiar to each signal and is read at the frequency of the common synchronisation clock $D_e$. A permanent phase comparison between the write signals associated with $F_e$ and the more rapid read signals results in the occurrence of a pulse stuffing demand which will be performed at a time provided for this purpose in the frame by inhibiting a read clock cycle. A pulse stuffing device performs the addition of bits in response to the phase comparator demand. However, on demultiplexing, such a device leads to a jitter on the regnerated frequency of the particular digital train concerned. The known systems aim at correcting, during multiplexing, the waiting time jitter caused by the time lag between the time of the pulse stuffing demand and the time of performing pulse stuffing.

In particular, in the case of multiplexing plesiochronous channels, the object of the present invention is to reduce this waiting jitter by means of a pulse stuffing demand generating device comprising a phase comparator of specific structure placed in the multiplexer.

The device according to the invention is of the kind comprising means for comparing the phases of the write clock signals HDI and the read clock signals HDL of a buffer store in which are written and read multiplexed digital information, the said store having a capacity of $n$ binary digits, wherein the said means comprise first means for comparing the phases of the rising edges of signals HDL and HDI, the said first means supplying a pulse stuffing demand signal when the rising edge of signal HDL is located in the "one" portion of the HDI signal, and second means for supplying a signal authorising the operation of the said first means, the said signal being supplied when one among $n$ rising edges of the HDI signal is located in the "zero" portion of a signal resulting from the division by $n$ of the HDL signal and the duration of which is equal to one digit time slot.

The device according to the invention provides for a digital comparison of the phases of the write and read signals, in accordance with discrete comparison times, the said times being supplied by the transitions of the clock signals to be compared. The said second means permit a coarse phase comparison or detection by quantizing the comparison times corresonding to $n$ binary digits, past the said first means permit a fine phase comparison or detection, by a quantizing of the comparison times equal to one digit time slot, the fine comparison being triggered off as a function of the result of the coarse comparison.

The fine comparison is necessary because for certain frequency conditions the coarse comparison alone could lead to an excessive waiting jitter during multiplexing.

Moreover, the device of the invention permits a pre-evaluation of the phase drift which is sufficient to authorise pulse stuffing. It makes it possible to minimise the waiting time between the demand and the performance of pulse stuffing.

Other advantages of the process and device for performing the same can be gathered from the following description with reference to the attached drawings, wherein show:

FIG. 1 a block diagram of the device according to the invention, and

Figure 2A:
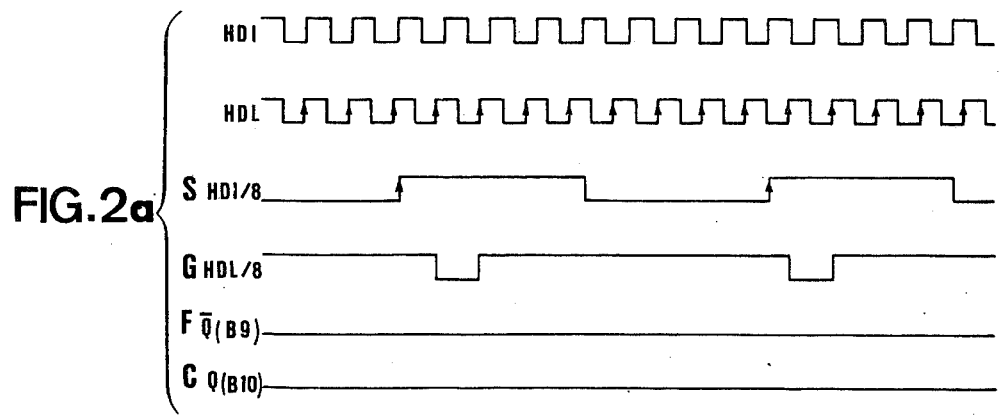
Figure 2B:
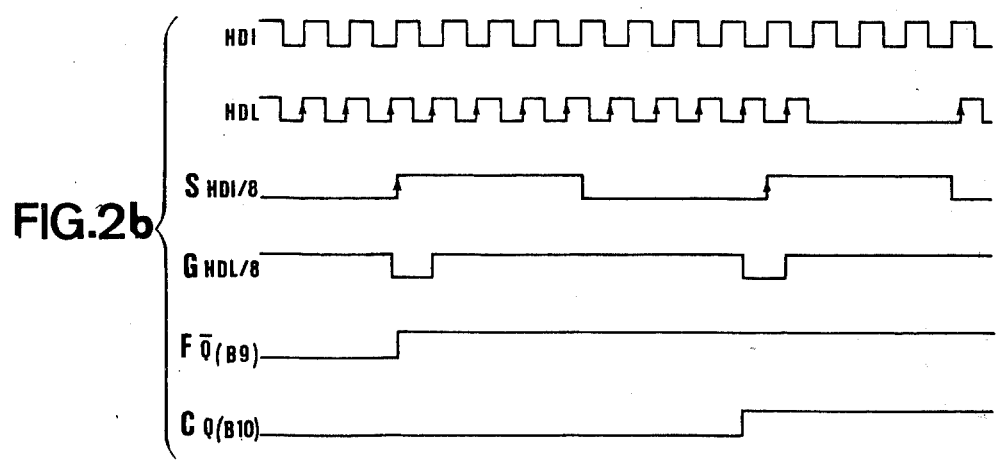
Figure 2C:
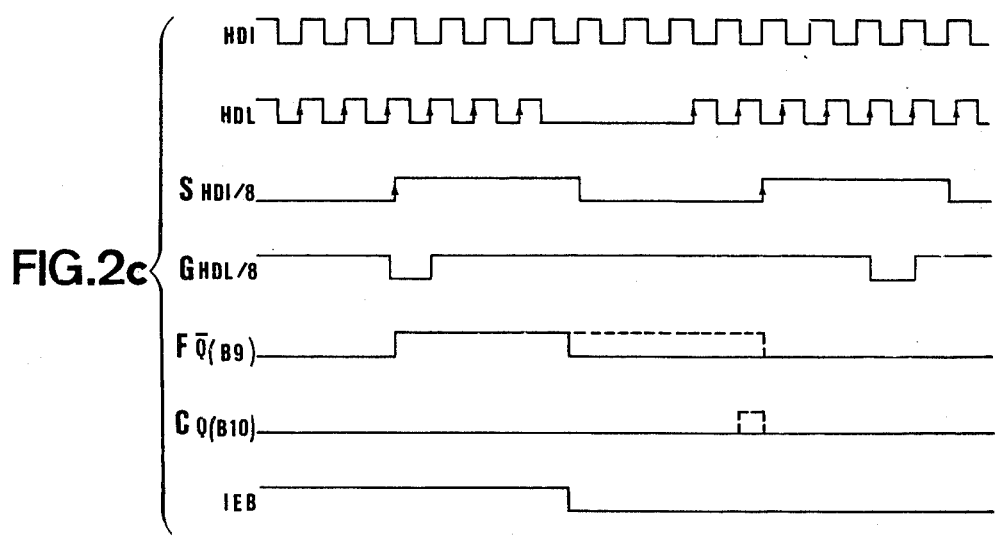

FIG. 2 (comprised of -c) a time chart based on three different operating states.

Referring first to FIG. 1, the binary information digits are written at a frequency $F_e$ into a buffer store 20 having $n$ stages, i.e. for one stage of the buffer store 20 the write clock frequency is $F_{e/n}$. The binary digits are read at the rate of a clock of frequency $D_e$, where $D_e$ exceeds $F_e$. The clock signals of frequencies $F_e$ and $D_e$ are fed into two counters 3 and 4, respectively.

A phase comparison device 1 according to the invention receives the clock signals from counters 3 and 4. Device 1 comprises two stores $B_9$ and $B_{10}$, for example, type D flip-flops, the assembly supplying a signal C which is transmitted to the pulse stuffing device 2 described hereinafter. The gating leads to the storing of a pulse stuffing demand in device 2. The performance of the stuffing operation or the addition of a bit has the effect of introducing a phase jump having the duration of a bit, and thus "erasing the gating". The clock time erasing signal E which causes the gating to be erased is introduced via a NAND gate $P_2$.

Pulse stuffing device 2 also receives the pulse stuffing authorisation signal AJ, produced when generating the frame and formed by one pulse per frame at the stuffable digit time slot. The pulse stuffing device 2 is a store which stores signal C and delivers signal E when it receives signal AJ.

FIG. 2 illustrates the process of the invention in three operating states. State $a$ shows a phase drift between the write clock HDI and the read clock HDL which does not suffice for triggering the coarse detection and therefore the fine detection. The signal S from counter 3 is a signal of frequency $F_{e/n}$. Store $B_9$, which is for example a bistable multivibrator receives at its clock input, signal S as well as signal G, obtained at the output of the NAND gate $P_1$ which receives two signals from counter 4, and formed of a negative pulse of duration equal to $1/D_e$ every $n$ read clock times. When the rising edge of S is outside the pulse of signal G, the output $\bar{Q}$ of $B_9$ remains in the zero state thus locking the output Q of flip-flop $B_{10}$ in the zero state.

State $b$ represents a larger phase drift between the write clock HDI of frequency $F_e$ and the read clock HDL of average frequency $D_e$. The rising edge of S is compared with the state of signal G, and the output $\bar{Q}$ of $B_9$ passes into state "one", i.e. is gated. Signal F supplied by output $\bar{Q}$ of flip-flop $B_9$ authorises the operation of flip-flop $B_{10}$. At this time flip-flop $B_{10}$ receiving signals from the write clock HDI and the read clock HDL at the clock input, remains in the zero state at Q, but is ready for gating. The abutment of flip-flop $B_{10}$ takes place when the phase drift is sufficient whereby the rising edge of read clock HDL is located in the "one"

portion of the write signal HDI. Thus, gating is brought about by means of flip-flop $B_{10}$, i.e. its passage into the "one" state, as from the time of pre-gating, at any instant of the read clock HDL as soon as the phase drift is sufficient. The resulting waiting time is minimum. Thus, flip-flop $B_9$ performs a phase comparison every $n$ bits, which represents the coarse detection. Flip-flop $B_{10}$ performs a phase comparison for every bit, i.e. a fine comparison which is only made effective in response to the result of the coarse detection. Fine comparison alone would not in itself ensure a correct average phase between writing and reading.

In a plesiochronous multiplexer, the pulse stuffing demands or gating of flip-fllp $B_{10}$, cannot occur immediately after a group of service digits, such as frame alignment digits or stuffing indication digits. Thus, the action of pre-gating or coarse detection, sampled every $n$ bits, on the gating or fine detection, must not continue during the clock times which immediately follow a group of service digits. For this reason the inhibition signal IEB resets the pre-gating flip-flop $B_9$, at the location of a group of service digits. This constitutes case $c$ shown in FIG. 2. Signal IEB has a "zero" level as from the start of a group of service digits and returns to "one" at the end of the said group.

Embodiments using a 8 bit-capacity buffer store have shown a waiting jitter of 120 ns peak to peak for a phase comparison every eight bits and 25 ns for a phase comparison for each bit.

What I claim is:

1. A pulse stuffing demand generating device of the kind comprising means for comparing the phases of the write clock signals HDI and the read clock signals HDL of a buffer store in which are written and read multiplexed digital information, the said store having a capacity of $n$ binary digits, wherein the said means comprise first means for comparing the phases of the rising edges of signals HDL and HDI, the said first means supplying a pulse stuffing demand signal when the rising edge of signal HDL is located in the "one" portion of the HDI signal, and second means for supplying a signal authorising the operation of the said first means, the said signal being supplied when one among $n$ rising edges of the HDI signal is located in the "zero" portion of a signal resulting from the division by $n$ of the HDL signal and the duration of which is equal to one binary digit time slot.

2. A device according to claim 1, wherein an inhibition signal associated with the frame is applied to the said second means, said signal only authorising the operation of the said second means when it is at the level "one", the said signal having the level "zero" during the time slots corresponding to a group of service digits.

* * * * *

UNITED STATES PATENT AND TRADEMARK OFFICE
CERTIFICATE OF CORRECTION

PATENT NO. : 4,072,826
DATED : February 7, 1978
INVENTOR(S) : Andre Auguste Aveneau It is certified that error appears in the above-identified patent and that said Letters Patent are hereby corrected as shown below:

[73] Assignment:

Societe Anonyme de Telecommunications
of Paris, FRANCE

Signed and Sealed this

Thirtieth Day of May 1978

[SEAL]

Attest:

RUTH C. MASON
Attesting Officer

LUTRELLE F. PARKER
Acting Commissioner of Patents and Trademarks